(12) United States Patent
Nishikawa

(10) Patent No.: US 8,844,378 B2
(45) Date of Patent: Sep. 30, 2014

(54) LOAD WEIGHT DETERMINING APPARATUS AND LOAD WEIGHT DETERMINING METHOD FOR ELECTRIC CHAIN BLOCK

(75) Inventor: Kazuhiro Nishikawa, Nakakoma-gun (JP)

(73) Assignee: Kito Corporation, Yamanashi (JP)

( * ) Notice: Subject to any disclaimer, the term of this patent is extended or adjusted under 35 U.S.C. 154(b) by 211 days.

(21) Appl. No.: 13/582,893

(22) PCT Filed: Mar. 23, 2011

(86) PCT No.: PCT/JP2011/057002
§ 371 (c)(1),
(2), (4) Date: Sep. 5, 2012

(87) PCT Pub. No.: WO2011/118641
PCT Pub. Date: Sep. 29, 2011

(65) Prior Publication Data
US 2012/0325021 A1    Dec. 27, 2012

(30) Foreign Application Priority Data
Mar. 24, 2010  (JP) ................................ 2010-069013

(51) Int. Cl.
*G01L 3/02* (2006.01)
*B66D 3/18* (2006.01)
*B66D 1/58* (2006.01)

(52) U.S. Cl.
CPC ... *B66D 1/58* (2013.01); *B66D 3/18* (2013.01)
USPC ........................ 73/862.193; 177/147; 702/174

(58) Field of Classification Search
USPC ...................................... 73/862.193; 702/174
See application file for complete search history.

(56) References Cited

U.S. PATENT DOCUMENTS 5,321,637 A *  6/1994  Anderson et al. ............. 702/174
6,864,654 B1 *  3/2005  Letor et al. .................... 318/434

FOREIGN PATENT DOCUMENTS

| JP | 06-046595 A | 2/1994 |
| JP | 11-246184 A | 9/1999 |
| JP | 2005-029280 A | 2/2005 |
| JP | 2009-029590 A | 2/2009 |

OTHER PUBLICATIONS

International Search Report of PCT/JP2011/057002, mailing date Jun. 28, 2011.

* cited by examiner

*Primary Examiner* — Lisa Caputo
*Assistant Examiner* — Roger Hernandez-Prewit
(74) *Attorney, Agent, or Firm* — Westerman, Hattori, Daniels & Adrian, LLP

(57) ABSTRACT

A load weight determining apparatus and method for an electric chain block having a lifting-lowering motor and an inverter controller. The lifting-lowering motor rotates a sheave to wind up and unwind a chain engaging the sheave. The load weight determining apparatus has a current detecting element detecting a motor current supplied to the lifting-lowering motor from the inverter controller, and a load weight determining unit. A torque current is calculated from the motor current detected by the load weight determining unit, and a variation cycle of the torque current is calculated. An average torque current value over a period of time corresponding to the variation cycle is calculated, and the average torque current value is compared with a set threshold to perform load weight determination.

9 Claims, 11 Drawing Sheets

TORQUE CURRENT FOR 1.0W AND 1.08W DURING LOW-SPEED LIFTING

LOAD WEIGHT DETERMINING APPARATUS AND LOAD WEIGHT DETERMINING METHOD FOR ELECTRIC CHAIN BLOCK

TECHNICAL FIELD

The present invention relates to a load weight determining apparatus and a load weight determining method that are capable of determining the weight of a load lifted by an electric chain block having an inverter-driven lifting-lowering motor, with high accuracy and within a short period of time after starting an operation.

BACKGROUND ART

FIG. 1 is a diagram showing the general structure of an inverter-driven electric chain block. As shown in the figure, the electric chain block has an inverter controller 11, a lifting-lowering motor 12, a speed reducer 13, and a control box 14. The control box 14 has a lifting button 14a and a lowering button 14b, which are two-step pushbutton switches. When the lifting button 14a is pressed to a first step, the control box 14 outputs a low-speed lifting signal to the inverter controller 11. When the lifting button 14a is pressed to a second step, the control box 14 outputs a high-speed lifting signal to the inverter controller 11. When the lowering button 14b is pressed to a first step, the control box 14 outputs a low-speed lowering signal to the inverter controller 11. When the lowering button 14b is pressed to a second step, the control box 14 outputs a high-speed lowering signal to the inverter controller 11.

Upon receiving the low-speed lifting signal, the high-speed lifting signal, the low-speed lowering signal, and the high-speed lowering signal from the control box 14, the inverter controller 11 supplies the lifting-lowering motor 12 with low-speed lifting electric power, high-speed lifting electric power, low-speed lowering electric power, and high-speed lowering electric power, respectively, of predetermined frequency, thereby causing the lifting-lowering motor 12 to rotate forward or reverse at low or high speed. Consequently, a sheave 15 rotates forward or reverse at low or high speed through the speed reducer 13, and a chain 16 engaging the sheave 15 is wound up or unwound at low or high speed. Thus, a load 18 suspended from the lower end of the chain 16 through a hook 17 is lifted or lowered at low or high speed.

In the above-described electric chain block, an electric current (hereinafter referred to as "motor current") supplied from the inverter controller 11 to the lifting-lowering motor 12 can be divided into an exciting current (an electric current needed to generate a magnetic flux) and a torque current (an electric current proportional to the load torque), as shown in FIG. 2, by a vector operation based on the output frequency and the phase of electric current for each phase with respect to the output voltage. Accordingly, the magnitude of the weight of load 18 can be determined with high accuracy from the torque current value by detecting a motor current and dividing the motor current into an exciting current and a torque current by a vector operation.

In this regard, the magnitude of the load weight can be determined substantially accurately from the torque current value in the case of an electrically-driven rope hoist as disclosed in Patent Literature 2, but load weight determination cannot be accurately performed in the case of the electric chain block for the following reason. The electric chain block winds up and unwinds, by a polygonal sheave 15, a chain 16 having vertical links 16a and horizontal links 16b of the same substantially oval configuration that are alternately joined to each other. With this structure, the load torque varies even for the same load weight, and the torque current value varies periodically, which makes it impossible to perform accurate load weight determination. As shown in FIG. 3, the position of the center line A, B of the chain 16, i.e. the load weight center, moves away from and toward the center of rotation of the sheave 15 within a predetermined range ΔL according to the angle of rotation of the sheave 15. In response to the movement of the load weight center away from and toward the center of rotation of the sheave 15, the load torque applied to the sheave 15 varies within a predetermined range. The variation of the load torque causes variation in the value of electric current supplied to the lifting-lowering motor 12 from the inverter controller 11. It should be noted that the reference symbol Lc in FIG. 3 denotes a length of the chain 16 corresponding to one link thereof.

FIG. 4 is a graph showing the change of torque current during a low-speed lifting operation of the electric chain block. Curve A shows the change of torque current for a rated load weight (load; 1.0 W), i.e. (current/rated current [%]), and curve B shows the change of torque current for a rated load weight×1.08 (1.08 W). FIG. 5 is a graph showing the change of torque current during a high-speed lifting operation of the electric chain block. Curve A shows the change of torque current for a rated load weight (1.0 W), i.e. (current/rated current [%]), and curve B shows the change of torque current for a rated load weight×1.08 (1.08 W). It is required for an electric hoisting machine to surely lift when the load weight is not in excess of the rated load weight and to automatically stop the lifting-lowering operation when the load weight exceeds 1.08 times the rated load weight. When the difference between load weights to be distinguished is small as stated above, the load variation due to the polygonal sheave of the electric chain block becomes larger than the load variation due to variation in load weight, so that it is impossible to distinguish between a load of 1.0 W and a load of 1.08 W. Even during a low-speed lifting operation, it is impossible to distinguish between a load of 1.0 W and a load of 1.08 W at the time of starting the operation.

CITATION LIST

Patent Literature

[PTL 1] Japanese Patent Application Publication No. 2009-29590
[PTL 2] Japanese Patent Application Publication No. Hei 11-246184

SUMMARY OF INVENTION

Technical Problem

The present invention has been made in view of the above-described circumstances. An object of the present invention is to provide a load weight determining apparatus and load weight determining method for an electric chain block that are capable of determining a load weight from the torque current of the electric chain block with high accuracy and within a short period of time after starting a lifting operation.

Solution to Problem

To solve the above-described problem, the present invention provides a load weight determining apparatus for an electric chain block having a lifting-lowering motor and an inverter controller supplying a driving electric power to the lifting-lowering motor. The lifting-lowering motor rotates a sheave to wind up and unwind a chain engaging the sheave. The load weight determining apparatus has motor current detecting means detecting a motor current supplied to the lifting-lowering motor from the inverter controller, torque current calculating means calculating a torque current by a vector operation from the motor current detected, moving average torque current value calculating means successively calculating an average of the torque current calculated over a last predetermined period of time according to a lifting speed of the electric chain block, and load weight judging means judging whether or not a lifted load weight value is in excess of a predetermined overload weight value by comparing the moving average torque current value with a set threshold.

Further, in the above-described load weight determining apparatus for the electric chain block according to the present invention, the predetermined period of time of the moving average torque current value calculating means is calculated by torque current variation cycle calculating means calculating a variation cycle of the torque current of the electric chain block.

Further, in the above-described load weight determining apparatus for the electric chain block according to the present invention, the torque current variation cycle calculating means can calculate a torque current variation cycle during high-speed lifting and a torque current variation cycle during low-speed lifting, and the moving average torque current value calculating means can calculate a moving average torque current during the high-speed lifting and a moving average torque current during the low-speed lifting. The load weight judging means sets different thresholds respectively for the high-speed lifting and the low-speed lifting and judges whether or not a lifted load weight value is in excess of a predetermined overload weight value during the high-speed lifting and the low-speed lifting, respectively.

In addition, the present invention provides a load weight determining method for an electric chain block having a lifting-lowering motor and an inverter controller supplying a driving electric power to the lifting-lowering motor. The lifting-lowering motor rotates a sheave to wind up and unwind a chain engaging the sheave. The load weight determining method comprises detecting a motor current supplied to the lifting-lowering motor from the inverter controller, calculating a torque current by a vector operation from the motor current detected, successively calculating an average of the torque current over a last predetermined period of time according to a lifting speed of the electric chain block to obtain a moving average torque current value, and comparing the moving average torque current value with a set threshold to judge whether or not a lifted load weight value is in excess of a predetermined overload weight value, thereby performing load weight determination.

Further, according to the above-described load weight determining method for the electric chain block, a length of time needed to wind up a length of the chain corresponding to 2 links of the chain is calculated from a lifting speed of the electric chain block to determine the predetermined period of time for calculating a moving average torque current value.

Further, according to the load weight determining method for the electric chain block, the calculating a torque current is performed during high-speed lifting and during low-speed lifting, respectively, and the predetermined period of time for calculating a moving average torque current value is set respectively for the high-speed lifting and the low-speed lifting. The calculating a moving average torque current value is performed during the high-speed lifting and during the low-speed lifting, respectively. The moving average torque current value during the high-speed lifting and a set threshold are compared with each other to judge whether or not a lifted load weight is in excess of a predetermined overload weight value, thereby performing load weight determination, and the moving average torque current value during the low-speed lifting and a set threshold are compared with each other to judge whether or not a lifted load weight is in excess of a predetermined overload weight value, thereby performing load weight determination.

Further, according to the above-described load weight determining method for the electric chain block, the load weight determination during the high-speed lifting is performed after a starting torque current has terminated, and the load weight determination during the low-speed lifting is performed before the starting current terminates.

Advantageous Effects of Invention

The present invention performs load weight determination by calculating a moving average torque current value of a varying torque current of an electric chain block. More specifically, an average torque current value over a last period of time needed to wind up a length of a chain corresponding to 2 links of the chain is successively calculated to obtain a moving average torque current value, and the moving average torque current value is compared with a preset threshold to perform load weight determination. Therefore, a load weight can be determined with high accuracy and within a short period of time after starting a lifting operation of the electric chain block.

DESCRIPTION OF EMBODIMENTS

Example 1

Figure 1:
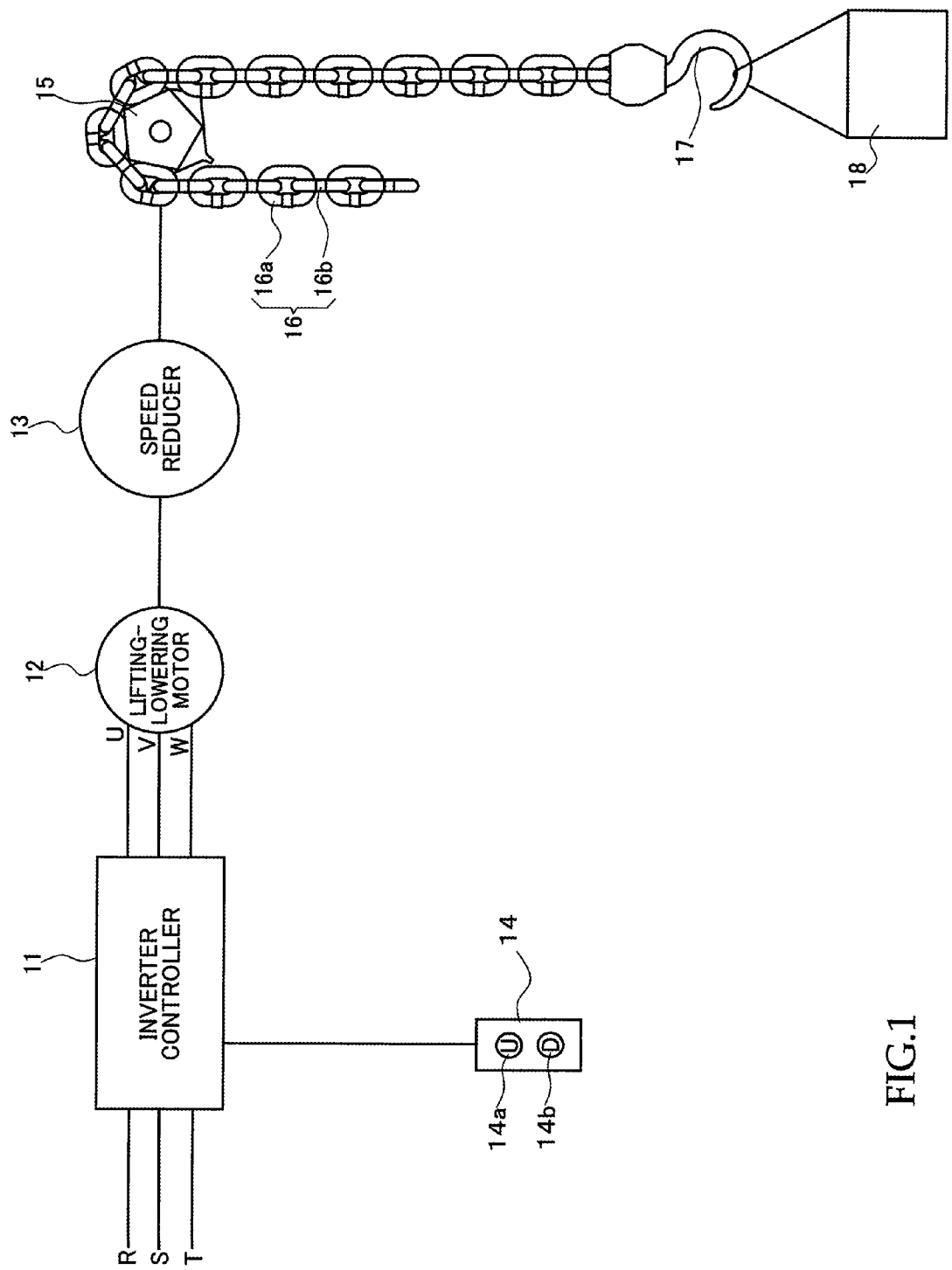
FIG. 1 is a diagram showing the general structure of an inverter-driven electric chain block.
Figure 2:
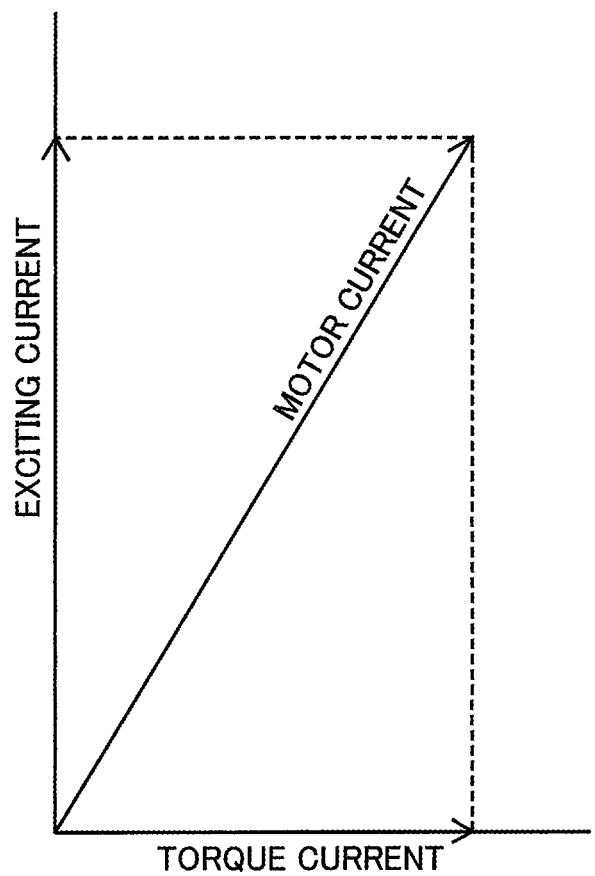
FIG. 2 is a graph showing the relationship between the exciting current and torque current of a motor current of the electric chain block.
Figure 3:
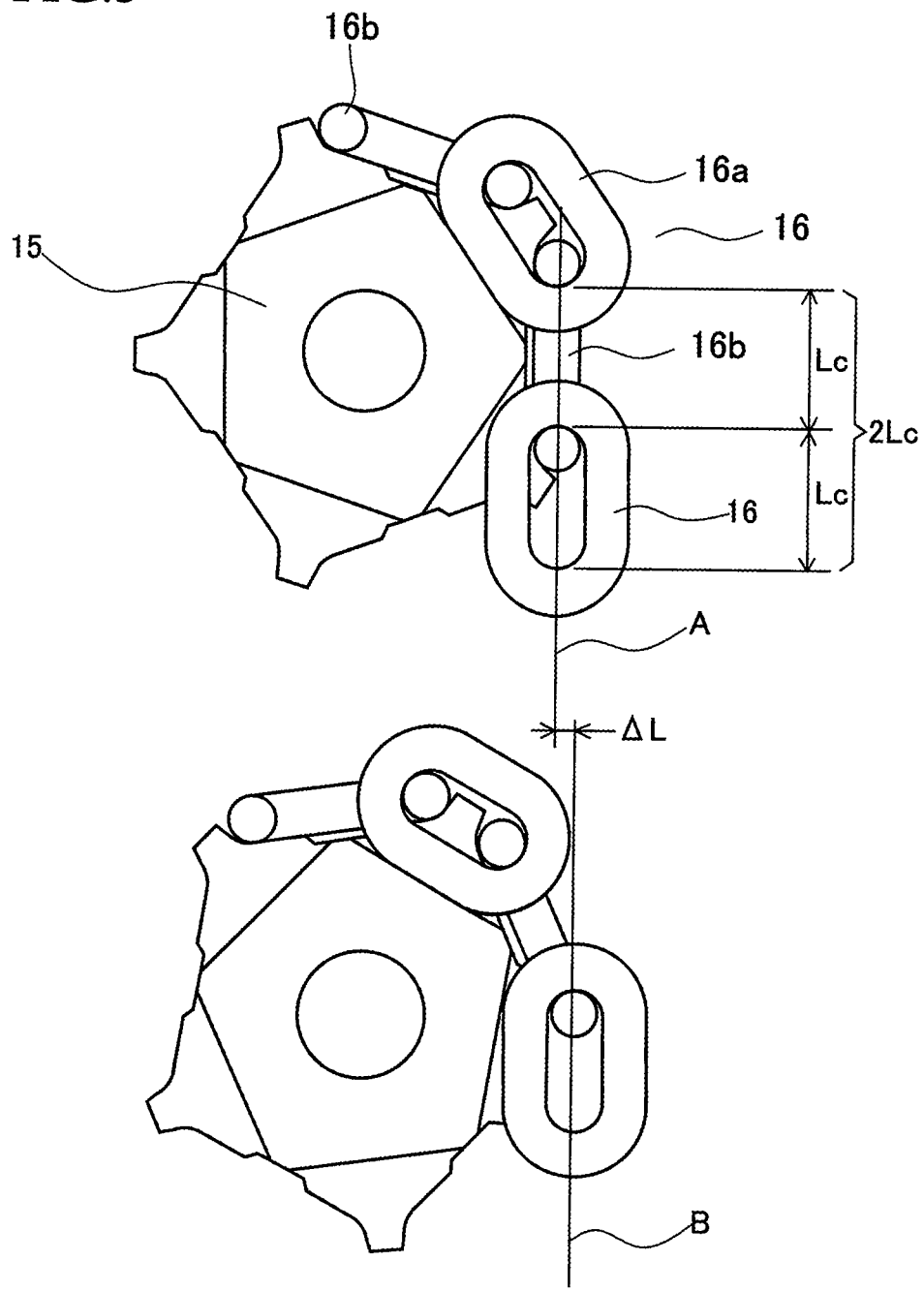
FIG. 3 is a diagram showing the way in which the center line of a chain oscillates in response to the rotation of a sheave of the electric chain block.

Embodiments of the present invention will be explained below in detail. The general structure of an electric chain block in which the load weight determining apparatus and load weight determining method according to the present invention are implemented is the same as shown in FIG. 1, and therefore, illustration and explanation thereof are omitted. In an electric chain block as shown in FIG. 1, a motor current supplied to a lifting-lowering motor 12 from an inverter controller 11 can be divided into an exciting current and a torque current by a vector operation, as shown in FIG. 2. The torque current is proportional to the load on the lifting-lowering motor 12 (i.e. the magnitude of the weight of lifted load 18 in this case). Therefore, it is possible to determine whether or not the electric chain block is overloaded by comparing the torque current with a set allowable value (threshold) of the electric chain block to judge whether or not the torque current is in excess of the threshold.

Figure 4:
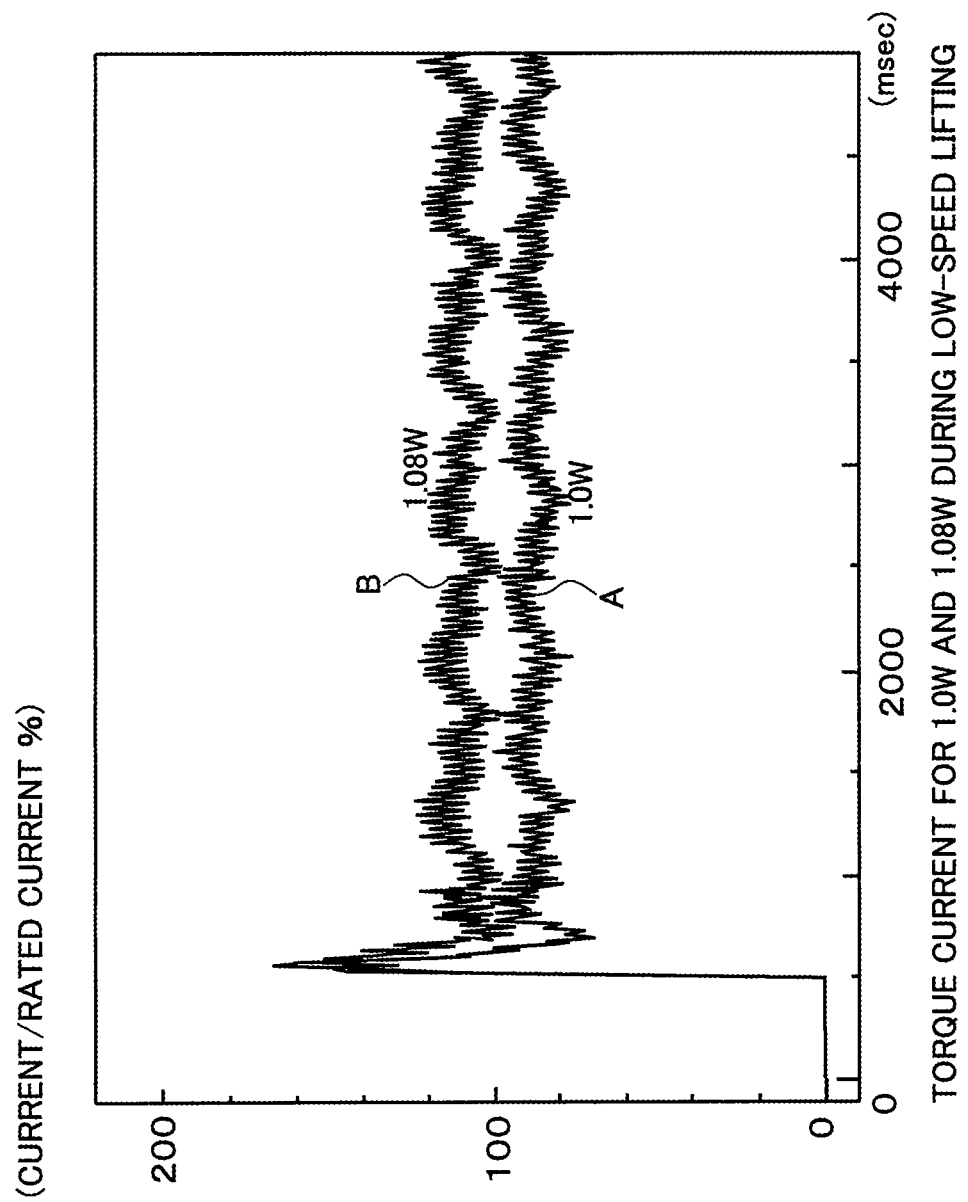
FIG. 4 is a graph showing the change of torque current during a low-speed lifting operation of the electric chain block.
Figure 5:
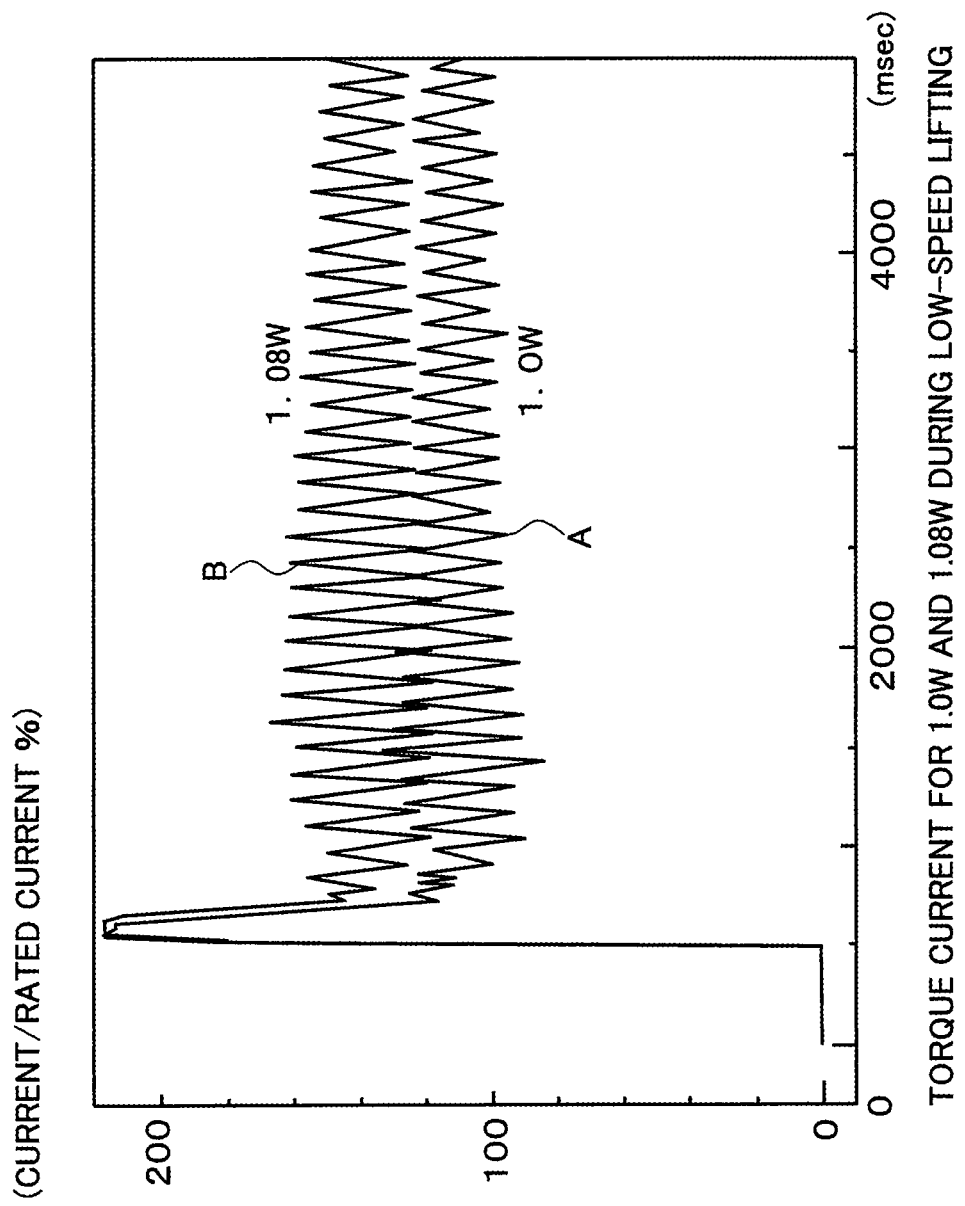
FIG. 5 is a graph showing the change of torque current during a high-speed lifting operation of the electric chain block.

Regarding the weight of a load lifted by the electric chain block, it is required for the electric chain block to surely lift when the load weight is not in excess of the rated load weight (rated load) and to automatically stop the lifting operation when the load weight exceeds 1.08 times the rated load weight. In this regard, however, the torque current during a lifting operation of the electric chain block periodically varies even for the same load weight, as shown in FIGS. 4 and 5, so that a proper threshold cannot be set between a rated load weight (1.0 W) at which the load concerned should be lifted and a load weight (1.08 W) at which lifting is disabled. At the time of starting a lifting operation, in particular, the torque current when the load weight is 1.0 W and the torque current when the load weight is 1.08 W are in a range in which the torque currents overlap each other. Accordingly, it is impossible to perform accurate load weight determination based on the torque current.

Figure 6:
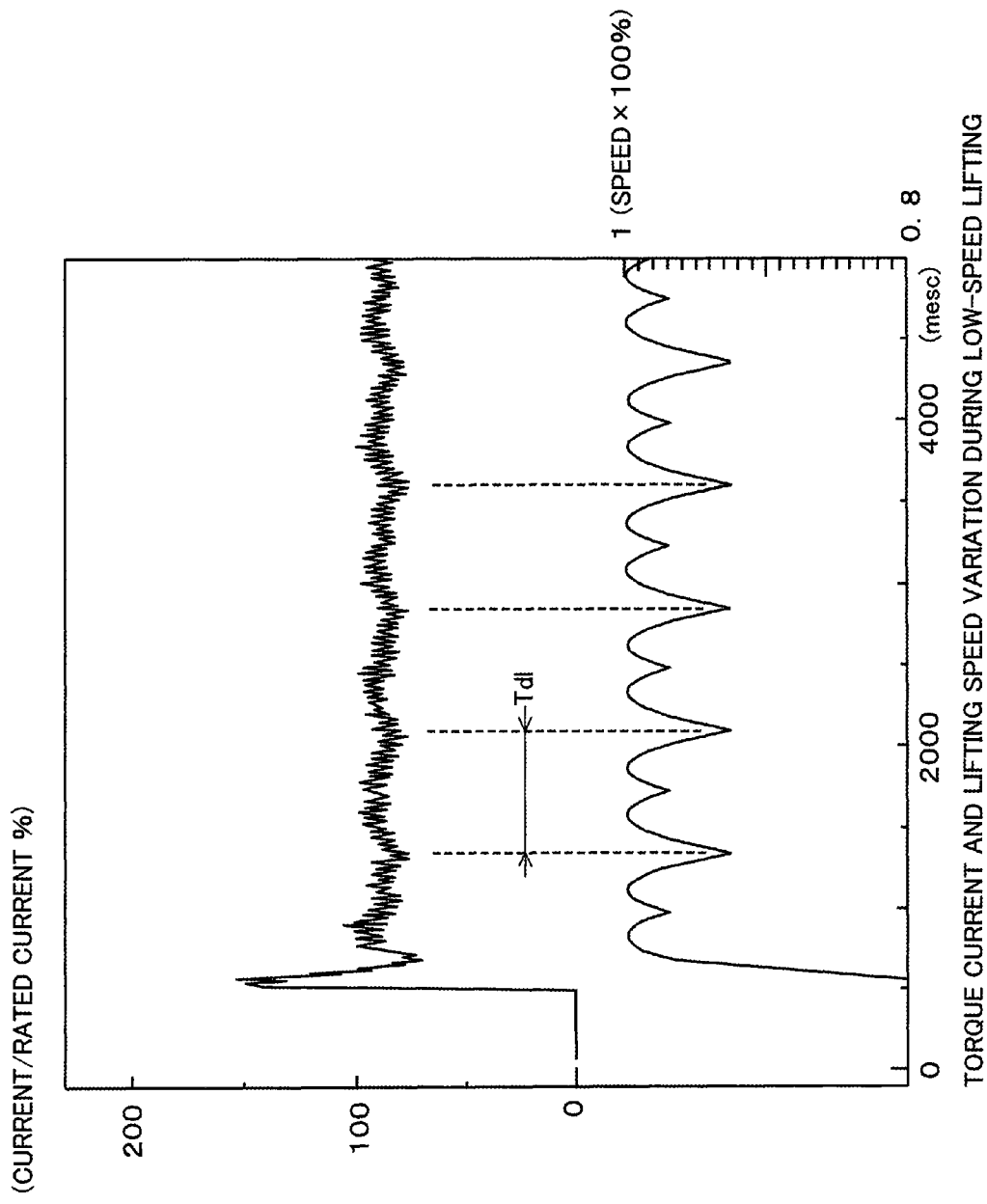
FIG. 6 is a graph showing the variation of torque current and the variation of lifting speed during low-speed lifting.
Figure 7:
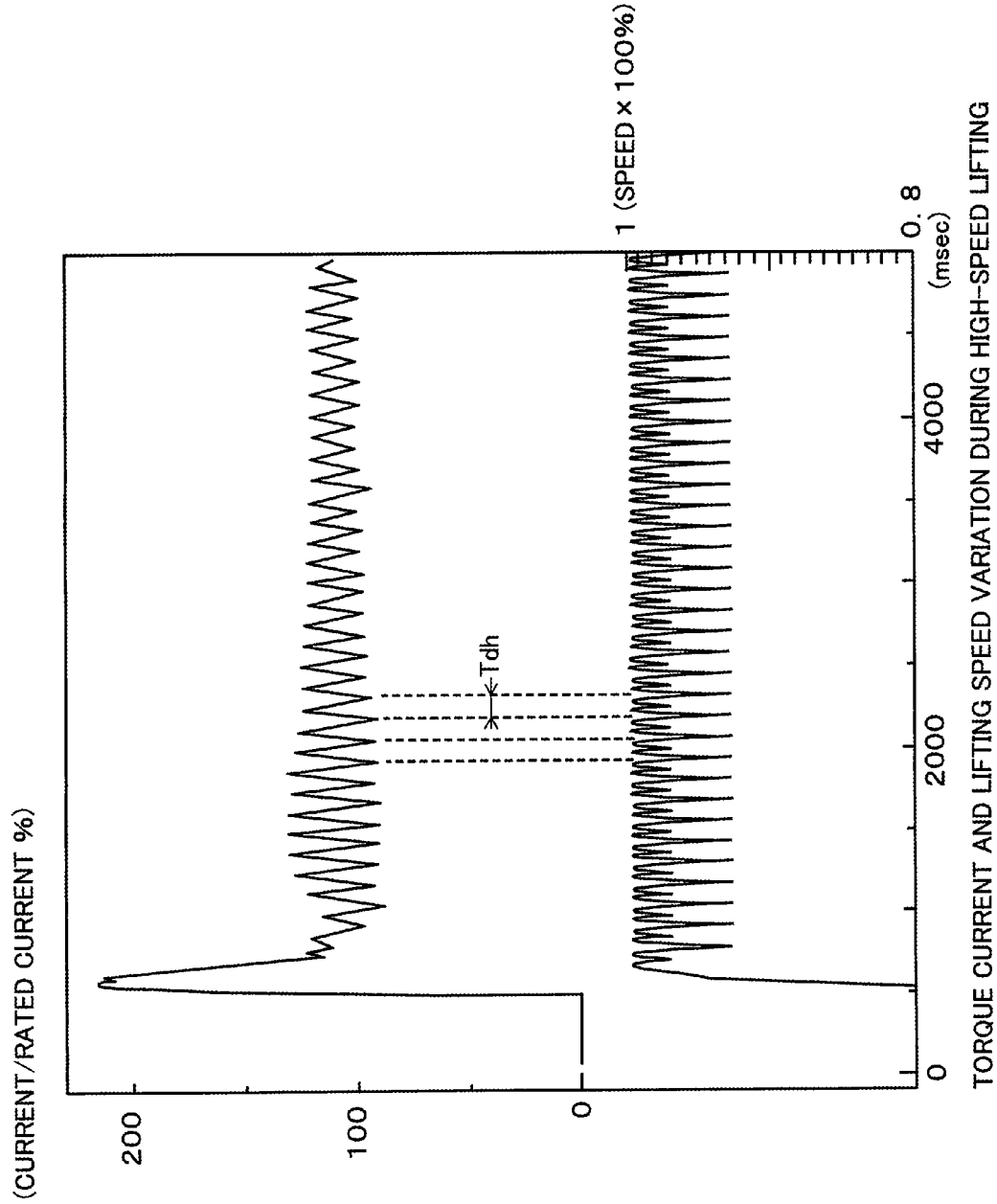
FIG. 7 is a graph showing the variation of torque current and the variation of lifting speed during high-speed lifting.
Figure 8:
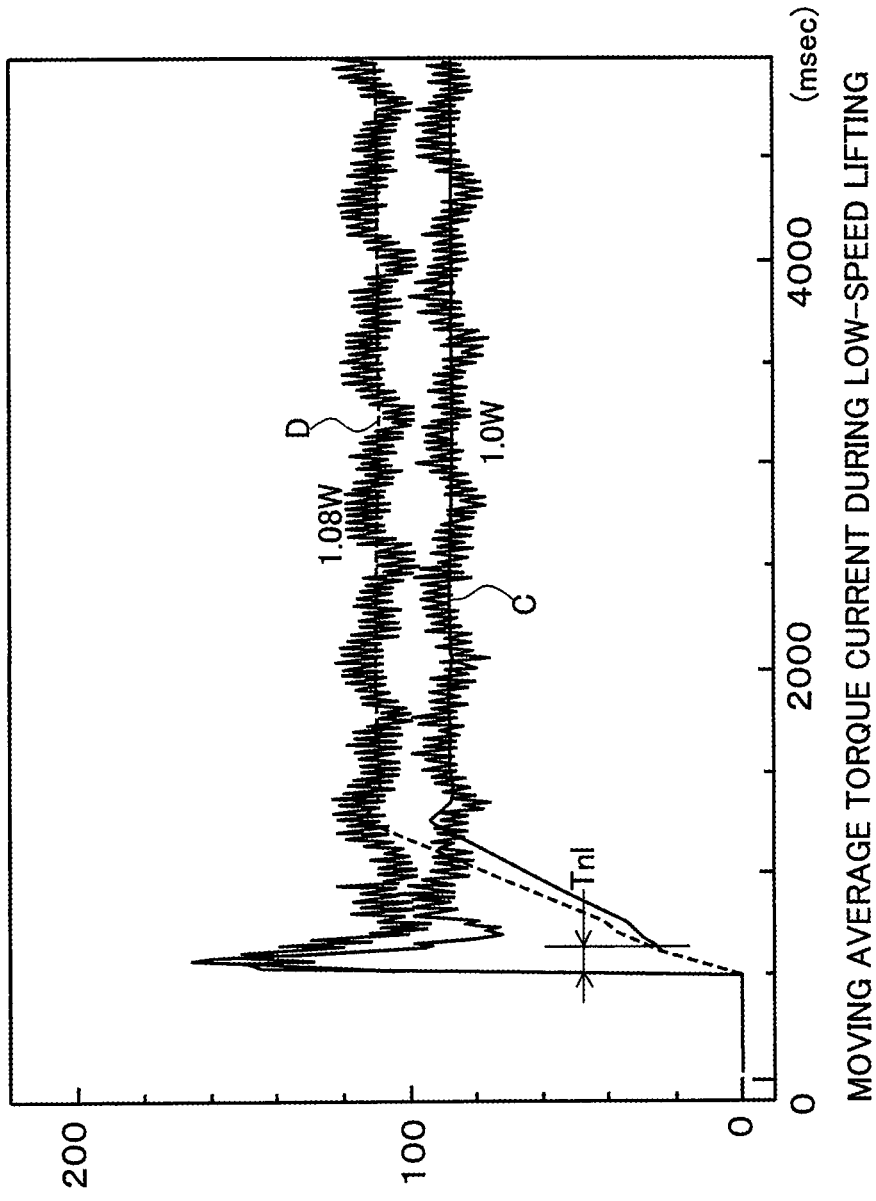
FIG. 8 is a graph showing the change of average torque current during low-speed lifting.
Figure 9:
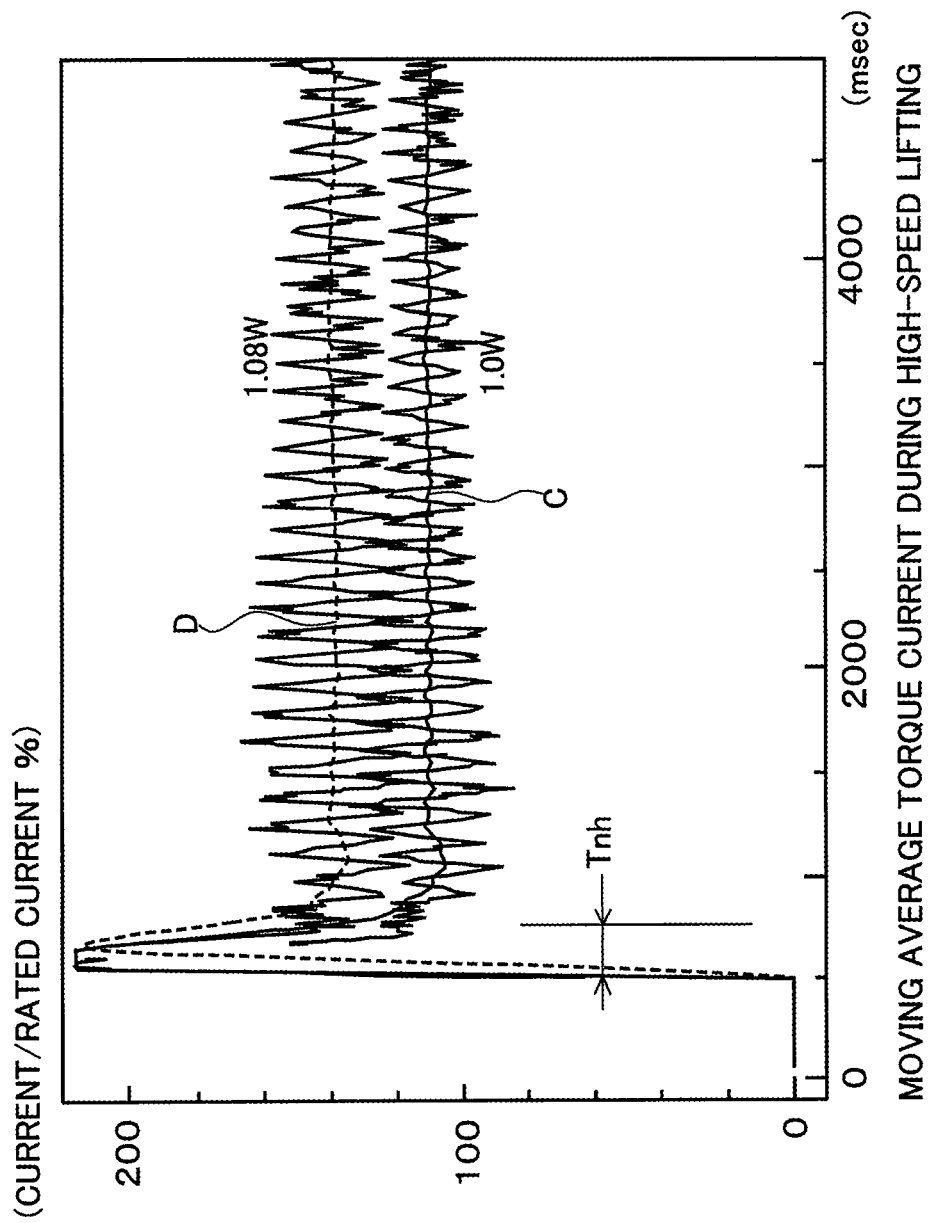
FIG. 9 is a graph showing the change of average torque current during high-speed lifting.

Incidentally, the variation of torque current and the variation of lifting speed during low-speed lifting and during high-speed lifting are as shown in FIGS. 6 and 7, respectively. It will be understood from the figures that the speed varies at a predetermined cycle T (Tdl, Tdh) during either of the low-speed lifting and the high-speed lifting and that the torque current varies at the same cycle T (Tdl, Tdh) as the speed variation. The cycle T coincides with a length of time needed to wind up one set of a vertical link 16a and a horizontal link 16b by the sheave 15. In this regard, moving average current values based on the cycle T are as shown by curves C and D in FIGS. 8 and 9. More specifically, curve C shows the moving average of torque current when the load weight is 1.0 W, and curve D shows the moving average of torque current when the load weight is 1.08 W. As shown in FIGS. 8 and 9, curves C and D are clearly separate from each other, except a predetermined time period from the time of starting the lifting operation. Therefore, setting a predetermined threshold between the two curves C and D makes it possible to determine with high accuracy whether or not the load on the lifting-lowering motor 12, i.e. the weight of load 18, is in excess of the threshold.

Here, let us explain the method of calculating moving average torque current values shown in FIG. 8, which shows the change of moving average torque current values during low-speed lifting. Let us assume as follows: F is the output frequency (Hz) of the inverter controller 11; P is the number of poles of the lifting-lowering motor 12; e is the slip factor of the lifting-lowering motor 12; N is the number of revolutions (rpm) of the lifting-lowering motor 12; S is the number of revolutions (rpm) of the sheave 15; M is the speed reduction ratio of the speed reducer 13; K is the number of angles of the sheave 15; and T is the length of time (sec) needed to wind up a length 2Lc of the chain corresponding to 2 links of the chain. On this assumption, the following expressions are given:

$$N = 120 \times F/P \times (1-e) \tag{1}$$

$$S = N \times M \tag{2}$$

$$T = 60/S/K \tag{3}$$

From expressions (1), (2) and (3), the following expression is obtained:

$$T = P/\{2 \times F \times (1-e) \times M \times K\} \tag{4}$$

Assuming that F=5 Hz (output frequency during low-speed lifting), P=4, e=0.05, M=0.06, and K=5, the variation cycle T is 1.404 seconds according to expression (4). It is assumed that torque current values are each calculated (sampled) every 10 milliseconds by a vector operation of the inverter controller 11 and that a predetermined number of last torque current values thus sampled are stored in a memory while being updated. An average of last 141 (1.404/0.010=140.4) torque current values of those stored in the memory is calculated to determine a moving average torque current value. FIG. 8 is a graph showing moving average torque current values successively calculated every time a torque current value is calculated (sampled) (every 10 milliseconds). It should be noted that a moving average torque current value over a period of time less than the variation cycle T (1.404 seconds) from the time of starting lifting is also calculated by dividing the total sum of torque current values obtained from the start of lifting by a number (141) obtained by dividing the variation cycle T by the sampling interval (10 milliseconds).

The following is an explanation of the method of calculating moving average torque current values shown in FIG. 9, which shows the change of moving average torque current values during high-speed lifting. Torque current values are each calculated (sampled) every 10 milliseconds by a vector operation of the inverter controller 11, and a predetermined number of last torque current values thus sampled are stored in a memory while being updated. Assuming that F=60 Hz (output frequency during high-speed lifting), P=4, e=0.05, M=0.06, and K=5, the variation cycle T is 0.117 seconds according to expression (4). An average of last 12 (0.117/0.010=11.7) torque current values of those stored in the memory is calculated to determine a moving average torque current value. FIG. 9 is a graph showing moving average torque current values successively calculated every time a torque current value is calculated (sampled) (every 10 milliseconds). It should be noted that a moving average torque current value over a period of time less than the variation cycle T (0.117 seconds) from the time of starting lifting is also calculated by dividing the total sum of torque current values obtained from the start of lifting by a number (12) obtained by dividing the variation cycle T by the sampling interval (10 milliseconds).

Among inverter-driven electric chain blocks, there has recently been proposed an electric chain block in which a motor current supplied to a lifting-lowering motor 12 from an inverter controller 11 is divided into an exciting current and a torque current by a vector operation, as shown in FIG. 2, and voltage compensation is made so as to supply a motor current corresponding to the load (weight of load 18), thereby enabling a high torque to be obtained at low speed. In this electric chain block, the inverter controller 11 is provided with the function of detecting a motor current supplied to the lifting-lowering motor 12 and dividing the motor current into an exciting current and a torque current by a vector operation. Therefore, the inverter controller 11 is additionally provided with the function of calculating a cycle T of torque current variation by the above-described equations (1) to (4), the function of calculating a moving average torque current value over a period of time corresponding to the cycle T, and the load weight determining function of comparing the moving average torque current value with a set threshold to thereby determine whether or not the weight of load 18 is an overload weight. By doing so, it becomes possible to perform load weight determination with high accuracy and within a short period of time.

Regarding the moving average torque values obtained during high-speed lifting shown in FIG. 9, curve C representing moving average torque current values for 1.0 W exceeds the value of the flat region of curve D representing moving average torque current values for 1.08 W at the time of starting lifting. Regarding the moving average torque values obtained during low-speed lifting shown in FIG. 8, curve C representing moving average torque current values for 1.0 W is not in excess of the value of the flat region (stable region) of curve D representing moving average torque current values for 1.08 W even at the time of starting lifting. Therefore, the threshold is set to a value between a value that is a predetermined amount smaller than the flat region (stable region) of curve D and the highest value of curve C, which represents moving average torque current values for 1.0 W. By doing so, even when the starting current has not yet terminated since the start of lifting, no moving average torque current value will exceed the threshold, provided that the load weight is not in excess of 1.0 W, and there is no possibility of mistaking a load weight of 1.0 W for an overload weight. For high-speed lifting, on the other hand, load weight determination is started after a predetermined time Tnh has elapsed from the time of starting lifting. By so doing, there is no possibility of mistaking a load of 1.0 W for an overload weight.

Although in the above-described example one cycle of the variation cycle T is used as the basis for calculation of a moving average torque current value, if a moving average torque current value calculated on the basis of an integral multiple of the variation cycle T is used, the torque current values are further smoothed, and the accuracy of determination is improved. With this method, however, the overload detection takes a longer time than the method using one variation cycle T as the basis for calculation. Therefore, it is the best to use as a criterion for determination a moving average torque current value over a period of time corresponding to one variation cycle T.

In the above-described expressions (1) to (4), the variation cycle T is calculated and set on the basis of an output frequency that the inverter controller 11 outputs to the lifting-lowering motor. In this regard, a variation cycle may be calculated by measuring the number of revolutions of the output shaft of the lifting-lowering motor 12, or the number of revolutions of the sheave 15, or the number of revolutions of the gear shaft or the like of the speed reducer 13, or by sequentially measuring a length of time needed to wind up a length of the chain 16 corresponding to 2 links of the chain 16. However, the method of calculating the number of revolutions of the lifting-lowering motor 12 from the output frequency supplied to the electric hoist is simple and easy and has sufficiently high accuracy. Alternatively, the following method may be adopted. Variation cycles corresponding to speeds preset in the electric chain block are stored in a memory, and a variation cycle corresponding to a command speed is read from the memory and set as a variation cycle to be used (a base period for calculating a moving average torque current value: number of samplings used to calculate an average).

Figure 10:
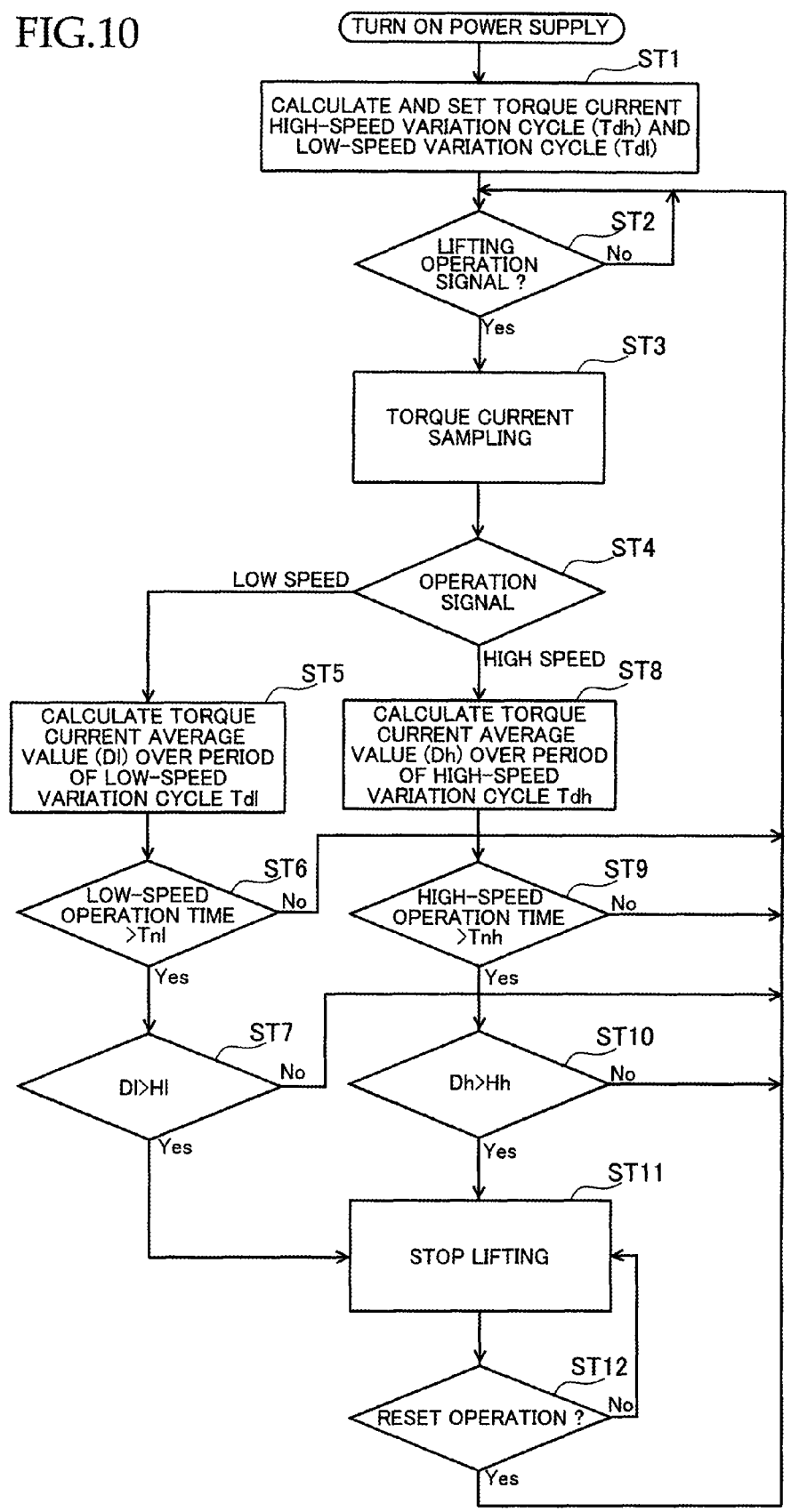
FIG. 10 is a chart showing the processing flow of the load weight determination for the electric chain block according to the present invention.

FIG. 10 is a chart showing the processing flow of the above-described load weight determination. First, the power supply of the electric chain block is turned on. At step ST1, a high-speed variation cycle (Tdh), which is a variation cycle of torque current in a high-speed operation, and a low-speed variation cycle (Tdl), which is a variation cycle of torque current in a low-speed operation, are calculated according to the above-described expressions (1) to (4) and set. Then, the process proceeds to step ST2. At step ST2, it is judged whether or not there is a lifting operation signal from the control box 14. If Yes is the answer, the process proceeds to step ST3. If No is the answer at step ST2, it is preferable to reset a predetermined number of torque current values sampled and stored in the memory. At step ST3, torque current sampling (measurement and calculation) is started, and then the process proceeds to step ST4. At step ST4, it is judged whether the operation signal is a high-speed operation signal or a low-speed operation signal. If the operation signal is a low-speed operation signal, the process proceeds to step ST5. If the operation signal is a high-speed operation signal, the process proceeds to step ST8.

At step ST5, a moving average torque current value Dl based on the low-speed variation cycle Tdl is calculated, and the process proceeds to step ST6. At step ST6, it is judged whether or not the low-speed operation time has exceeded a low-speed starting current ignoring period Tnl (see FIG. 8) (low-speed operation time>Tnl). If No is the answer, the process returns to the above-described step ST2. If Yes is the answer, the process proceeds to step ST7. At step ST7, it is judged whether or not the moving average torque current value Dl calculated at step ST5 is in excess of a low-speed moving average threshold Hl (Dl>Hl). If No is the answer, the process returns to the above-described step ST2. If Yes is the answer, the process proceeds to step ST11, where the lifting operation is stopped.

At the above-described step ST8, a moving average torque current value Dh based on the high-speed variation cycle Tdh is calculated, and the process proceeds to step ST9. At step ST9, it is judged whether or not the high-speed operation time has exceeded a high-speed starting current ignoring period Tnh (see FIG. 9) (high-speed operation time>Tnh). If No is the answer, the process returns to the above-described step ST2. If Yes is the answer, the process proceeds to step ST10. At step ST10, it is judged whether or not the moving average torque current value Dh calculated at step ST8 is in excess of a high-speed moving average threshold Hh (Dh>Hh). If No is the answer, the process returns to the above-described step ST2. If Yes is the answer, the process proceeds to step ST11, where the lifting operation is stopped. It should be noted that the low-speed starting current ignoring period Tnl and the high-speed starting current ignoring period Tnh are each set to the shortest time at which the starting current becomes so small that an overload weight can be determined by an average threshold. By doing so, it becomes possible to perform high-accuracy load weight determination within the shortest time after starting the lifting operation. In a case as shown in FIG. 8, Tnl may be set to 0, as has been stated above.

After stopping the lifting operation at step ST11, the process proceeds to step ST12, where it is judged whether or not a reset operation has been performed. If No is the answer, a reset operation is awaited. If Yes is the answer, the process returns to step ST2. The reset operation is performed by depressing an emergency stop button or the lowering button 14b.

Figure 11:
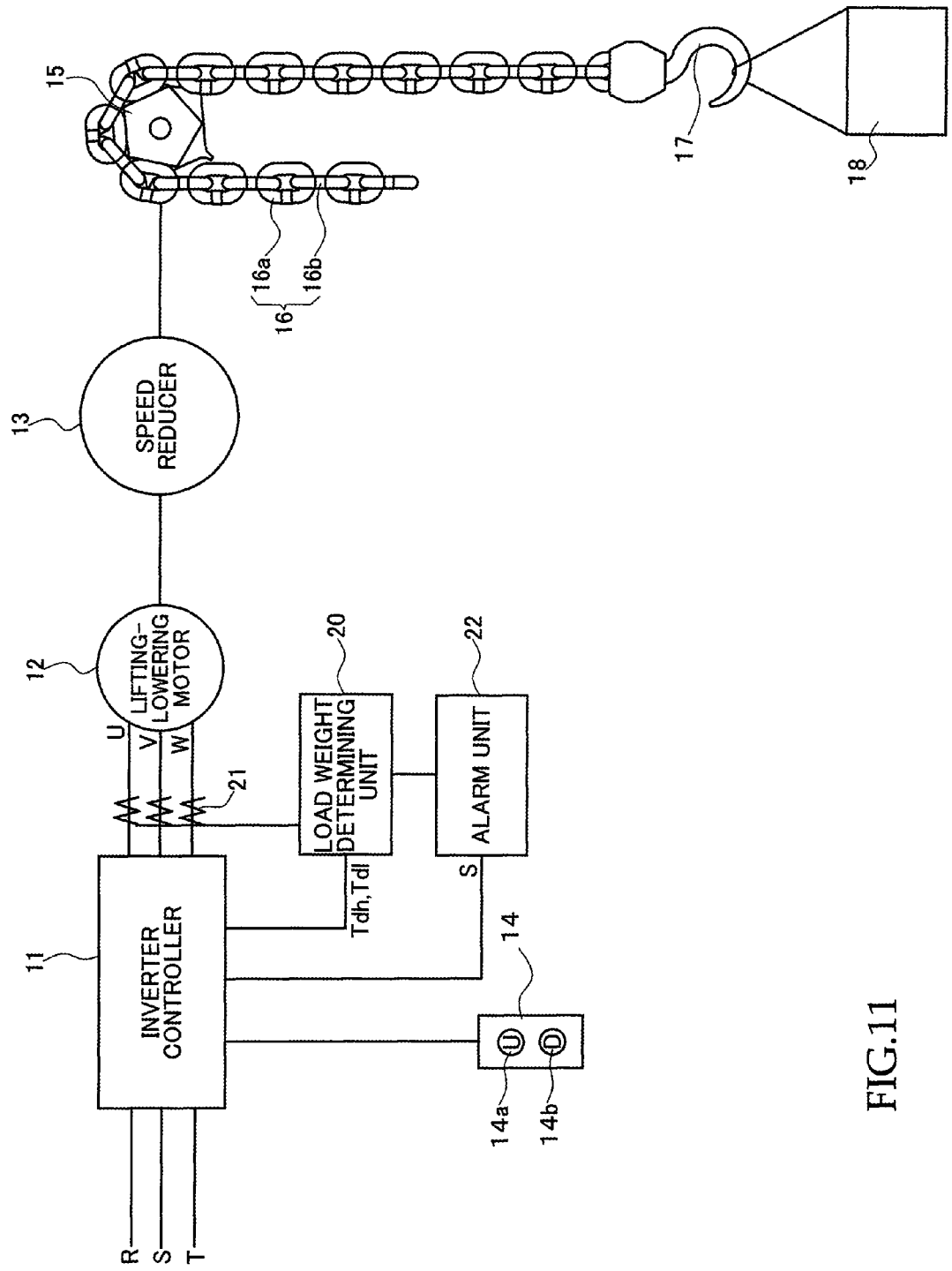
FIG. 11 is a diagram showing the general structure of an inverter-driven electric chain block having a load weight determining apparatus according to the present invention.

It should be noted that, in the above-described embodiment, the inverter controller 11 carries out processing such as detection of a motor current supplied to the lifting-lowering motor 12 from the inverter controller 11, processing of dividing the motor current into an exciting current and a torque current by a vector operation, calculation of a torque current variation cycle T according to the above-described expressions (1) to (4), calculation of a moving average torque current value on the basis of the cycle T, and comparison of the moving average torque current value with a set threshold. The present invention, however, is not limited to the above. For example, the arrangement may be as follows. As shown in FIG. 11, a load weight determining unit 20 is provided separately from the inverter controller 11. The load weight determining unit 20 is supplied as input with a motor current detected by a current detecting element 21 and also supplied with high-speed and low-speed torque current variation cycles Tdh and Tdl from the inverter controller 11. The load weight determining unit 20 calculates high-speed and low-speed torque currents from motor currents during high-speed and low-speed lifting, respectively, by a vector operation, calculates high-speed and low-speed moving average torque current values of the high-speed and low-speed torque currents on the basis of the high-speed and low-speed torque current variation cycles Tdh and Tdl, respectively, and compares the high-speed and low-speed moving average torque current values with respective set thresholds. If the high-speed and low-speed moving average torque current values are in excess of the respective thresholds, it is judged that the electric chain block is overloaded, and the load weight determining unit 20 outputs an overload signal to an alarm unit 22 to give an alarm and sends a stop signal S to the inverter controller 11.

Although embodiments of the present invention have been explained above, the present invention is not limited to the foregoing embodiments but can be modified in a variety of ways without departing from the scope of the claims and the technical idea indicated in the specification and the drawings.

INDUSTRIAL APPLICABILITY

The present invention has motor current detecting means detecting a motor current supplied to a lifting-lowering motor from an inverter controller, torque current calculating means calculating a torque current by a vector operation from the motor current detected, torque current variation cycle calculating means calculating a variation cycle of the torque current, moving average torque current value calculating means calculating a torque current average value from sampling data over a period of time corresponding to the variation cycle of the torque current, and load weight judging means judging whether or not a lifted load weight value is in excess of a predetermined overload weight value by comparing the moving average torque current value with a set threshold. Therefore, the present invention can be used as a load weight determining apparatus for an electric chain block that can determine a load weight with high accuracy and within a short period of time after starting a lifting operation.

LIST OF REFERENCE SIGNS

11: inverter controller
12: lifting-lowering motor
13: speed reducer
14: control box
15: sheave
16: chain
17: hook
18: load
20: load weight determining unit
21: current detecting element
22: alarm unit

The invention claimed is:

1. A load weight determining apparatus for an electric chain block having a lifting-lowering motor and an inverter controller supplying a driving electric power to the lifting-lowering motor, wherein the lifting-lowering motor rotates a sheave to wind up and unwind a chain engaging the sheave;
the load weight determining apparatus comprising:
motor current detecting means detecting a motor current supplied to the lifting-lowering motor from the inverter controller;
torque current calculating means calculating a torque current by a vector operation from the motor current detected;
moving average torque current value calculating means successively calculating an average of the torque current calculated over a last predetermined period of time according to a lifting speed of the electric chain block; and
load weight judging means judging whether or not a lifted load weight value is in excess of a predetermined overload weight value by comparing the moving average torque current value with a set threshold.

2. The load weight determining apparatus for the electric chain block according to claim 1, wherein the predetermined period of time of the moving average torque current value calculating means is calculated by torque current variation cycle calculating means calculating a variation cycle of the torque current of the electric chain block.

3. The load weight determining apparatus for the electric chain block according to claim 2, wherein the torque current variation cycle calculating means can calculate a torque current variation cycle during high-speed lifting and a torque current variation cycle during low-speed lifting, and the moving average torque current value calculating means can calculate a moving average torque current during the high-speed lifting and a moving average torque current during the low-speed lifting, and wherein the load weight judging means sets different thresholds respectively for the high-speed lifting and the low-speed lifting and judges whether or not a lifted load weight value is in excess of a predetermined overload weight value during the high-speed lifting and the low-speed lifting, respectively.

4. A load weight determining method for an electric chain block having a lifting-lowering motor and an inverter controller supplying a driving electric power to the lifting-lowering motor, wherein the lifting-lowering motor rotates a sheave to wind up and unwind a chain engaging the sheave;
the load weight determining method comprising:
detecting a motor current supplied to the lifting-lowering motor from the inverter controller and calculating a torque current by a vector operation from the motor current detected;
successively calculating an average of the torque current over a predetermined last period of time according to a lifting speed of the electric chain block to obtain a moving average torque current value; and
comparing the moving average torque current value with a set threshold to judge whether or not a lifted load weight value is in excess of a predetermined overload weight value, thereby performing load weight determination.

5. The load weight determining method for the electric chain block according to claim 4, wherein a length of time needed to wind up a length of the chain corresponding to 2 links of the chain is calculated from a lifting speed of the electric chain block to determine the predetermined period of time for calculating a moving average torque current value.

6. The load weight determining method for the electric chain block according to claim 5, wherein the calculating a torque current is performed during high-speed lifting and during low-speed lifting, respectively, and the predetermined period of time for calculating a moving average torque current value is set respectively for the high-speed lifting and the low-speed lifting;

the calculating a moving average torque current value being performed during the high-speed lifting and during the low-speed lifting, respectively;

wherein the moving average torque current value during the high-speed lifting and a set threshold are compared with each other to judge whether or not a lifted load weight value is in excess of a predetermined overload weight value, thereby performing load weight determination, and the moving average torque current value during the low-speed lifting and a set threshold are compared with each other to judge whether or not a lifted load weight value is in excess of a predetermined overload weight value, thereby performing load weight determination.

7. The load weight determining method for the electric chain block according to claim 6, wherein the load weight determination during the high-speed lifting is performed after a starting torque current has terminated, and the load weight determination during the low-speed lifting is performed before the starting current terminates.

8. The load weight determining method for the electric chain block according to claim 4, wherein the calculating a torque current is performed during high-speed lifting and during low-speed lifting, respectively, and the predetermined period of time for calculating a moving average torque current value is set respectively for the high-speed lifting and the low-speed lifting;

the calculating a moving average torque current value being performed during the high-speed lifting and during the low-speed lifting, respectively;

wherein the moving average torque current value during the high-speed lifting and a set threshold are compared with each other to judge whether or not a lifted load weight value is in excess of a predetermined overload weight value, thereby performing load weight determination, and the moving average torque current value during the low-speed lifting and a set threshold are compared with each other to judge whether or not a lifted load weight value is in excess of a predetermined overload weight value, thereby performing load weight determination.

9. The load weight determining method for the electric chain block according to claim 8, wherein the load weight determination during the high-speed lifting is performed after a starting torque current has terminated, and the load weight determination during the low-speed lifting is performed before the starting current terminates.

* * * * *